United States Patent
Kang et al.

(10) Patent No.: US 11,866,534 B2
(45) Date of Patent: Jan. 9, 2024

(54) DICYCLOPENTADIENE-BASED RESIN, DICYCLOPENTADIENE-BASED HYDROGENATED RESIN, AND ADHESIVE RESIN COMPOSITION COMPRISING SAME

(71) Applicant: HANWHA SOLUTIONS CORPORATION, Seoul (KR)

(72) Inventors: Hyeonuk Kang, Daejeon (KR); Do Hyun Byun, Daejeon (KR); Kyongjun Yoon, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 241 days.

(21) Appl. No.: 17/299,797

(22) PCT Filed: Oct. 31, 2019

(86) PCT No.: PCT/KR2019/014534
§ 371 (c)(1),
(2) Date: Jun. 4, 2021

(87) PCT Pub. No.: WO2020/116788
PCT Pub. Date: Jun. 11, 2020

(65) Prior Publication Data
US 2022/0025094 A1    Jan. 27, 2022

(30) Foreign Application Priority Data
Dec. 5, 2018   (KR) .................. 10-2018-0154896

(51) Int. Cl.
| | | |
|---|---|---|
| C08F 232/08 | (2006.01) | |
| C08F 226/02 | (2006.01) | |
| C08L 91/00 | (2006.01) | |
| C09J 11/08 | (2006.01) | |
| C09J 145/00 | (2006.01) | |

(52) U.S. Cl.
CPC .......... *C08F 232/08* (2013.01); *C08F 226/02* (2013.01); *C08L 91/00* (2013.01); *C09J 11/08* (2013.01); *C09J 145/00* (2013.01); *C09J 2301/312* (2020.08)

(58) Field of Classification Search
CPC ...... C08F 232/08; C08F 226/02; C08L 91/00; C09J 11/08; C09J 145/00; C09J 2301/312
USPC ........................................................ 526/283
See application file for complete search history.

(56) References Cited

U.S. PATENT DOCUMENTS

| | | | | |
|---|---|---|---|---|
| 3,939,129 A | * | 2/1976 | Marie ................... | C08F 210/00 528/319 |
| 4,032,486 A | | 6/1977 | Gobran | |

FOREIGN PATENT DOCUMENTS

| | | |
|---|---|---|
| CN | 106880623 A | 6/2017 |
| EP | 2573145 A1 | 5/2010 |
| JP | 50-46788 A | 4/1975 |
| JP | 2004515618 A | 5/2004 |
| JP | 2007523979 A | 8/2007 |
| KR | 20130027518 A | 3/2013 |
| KR | 20160056170 A | 5/2016 |
| KR | 20170138360 A | 12/2017 |
| KR | 20180036630 A * | 4/2018 |
| KR | 1020180036630 A | 4/2018 |
| TW | 201708287 A | 3/2017 |
| WO | 2014156555 A1 | 10/2014 |

OTHER PUBLICATIONS

European Search Report dated Jul. 15, 2022.
International Search Report dated Feb. 13, 2020.

\* cited by examiner

*Primary Examiner* — Michael M. Bernshteyn
(74) *Attorney, Agent, or Firm* — Harvest IP Law, LLP

(57) ABSTRACT

The present invention relates to: a dicyclopentadiene-based resin having excellent compatibility with a base resin and prepared by being copolymerized with a monomer composition comprising a dicyclopentadiene-based monomer and a vinylamide-based monomer; a dicyclopentadiene-based hydrogenated resin; and an adhesive resin composition comprising same. A dicyclopentadiene-based resin according to the present invention is advantageous in terms of having excellent compatibility with various base resins and being providable as an adhesive resin composition capable of achieving remarkably improved adhesive strength.

6 Claims, No Drawings

DICYCLOPENTADIENE-BASED RESIN, DICYCLOPENTADIENE-BASED HYDROGENATED RESIN, AND ADHESIVE RESIN COMPOSITION COMPRISING SAME

CROSS-REFERENCE TO RELATED APPLICATIONS

This application is a National Stage of International Application No. PCT/KR2019/014534 filed Oct. 31, 2019, claiming priority based on Korean Patent Application No. 10-2018-0154896 filed Dec. 5, 2018.

TECHNICAL FIELD

The present invention relates to a dicyclopentadiene-based resin having excellent compatibility with various base resins, a dicyclopentadiene-based hydrogenated resin, and an adhesive resin composition including the same.

BACKGROUND ART

A petroleum resin is a representative tackifier or adhesive, and is mainly used as a material to impart tackiness or adhesiveness to an adhesive tape or a product such as a paint, an ink, a rubber, or a tire. The petroleum resin is a liquid phase or a solid phase at room temperature and may have various forms ranging from a transparent semi-fluid liquid to a light yellow or colorless and transparent solid.

Among the petroleum resins, a dicyclopentadiene (DCPD) resin is mixed with various base resins such as an amorphous polyalphaolefin (APAO), ethylene vinyl acetate (EVA), and styrenic block copolymers (SBCs), and is used as a tackifier resin of a tackifier or an adhesive by a hydrogenation reaction.

Since it is difficult to adjust a compatibility of the dicyclopentadiene hydrogenated resin due to the structural limitation of the raw material and the resin, the dicyclopentadiene hydrogenated resin represents highly compatible properties with a base resin such as a styrenic-isoprene-styrene copolymer, but is not appropriate for use with a base resin such as a styrenic-butadiene-styrene copolymer. Thus, in order to increase compatibility with various base resins, a technique to adjust a polarity degree of the hydrogenated resin, is needed.

In order to solve this, conventionally, a copolymer obtained by copolymerizing a C9-based monomer selected from styrene-based and indene-based monomers or a C5-based monomer such as piperylene with dicyclopentadiene, was provided.

At the time of copolymerizing the C9-based monomer or C5-based monomer with a dicyclopentadiene monomer, when the content of the dicyclopentadiene monomer was high, the melt viscosity of the final dicyclopentadiene hydrogenated resin was rather increased and the compatibility with the base resin was weak, so that an excessive amount of C9-based monomer or C5-based monomer was required and high technology such as selective hydrogenation was required, and thus, production was not easy. In addition, when an adhesive tape was applied, cohesiveness or a 180° peel strength was good, but an initial tackiness strength was relatively poor.

Thus, it is required to develop a tackifier including a dicyclopentadiene hydrogenated resin, in which an initial tackiness strength, a 180° peel strength, and cohesiveness are balanced, while having excellent compatibility with a base resin, thereby implementing excellent tackifying properties.

DISCLOSURE

Technical Problem

An object of the present invention is to provide a dicyclopentadiene-based resin having excellent compatibility with various base resins and a hydrogenated resin thereof.

Another object of the present invention is to provide an adhesive resin composition in which a dicyclopentadiene-based hydrogenated resin prepared by including a vinylamide-based monomer is mixed with various base resins.

Still another object of the present invention is to provide an adhesive resin composition having a better adhesive strength when provided as an adhesive.

Technical Solution

In one general aspect, a dicyclopentadiene-based resin is prepared by copolymerizing a monomer composition including a dicyclopentadiene-based monomer and a vinylamide-based monomer.

The vinylamide-based monomer according to an exemplary embodiment of the present invention may satisfy the following Chemical Formula 1:

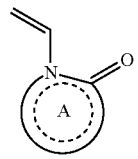

[Chemical Formula 1]

wherein

A is a saturated or unsaturated cyclic hydrocarbon.

The dicyclopentadiene-based monomer and the vinylamide-based monomer according to an exemplary embodiment of the present invention may be included at a weight ratio of 99:1 to 50:50.

In another general aspect, a dicyclopentadiene-based hydrogenated resin is prepared by hydrogenating the dicyclopentadiene-based resin described above.

In still another general aspect, an adhesive resin composition includes the dicyclopentadiene-based hydrogenated resin described above and a thermoplastic resin.

The adhesive resin composition according to an exemplary embodiment of the present invention may further include an oil.

The oil according to an exemplary embodiment of the present invention may include any one or two or more selected from the group consisting of paraffin-based oils, naphthene-based oils, aromatic-based oils, and the like.

The adhesive resin composition according to an exemplary embodiment of the present invention may include 50 to 90 wt % of the dicyclopentadiene-based hydrogenated resin and 10 to 50 wt % of the thermoplastic resin, based on the total weight of the composition.

The adhesive resin composition according to an exemplary embodiment of the present invention may include 1 to 60 parts by weight of the oil, based on 100 parts by weight of the dicyclopentadiene-based hydrogenated resin and the thermoplastic resin.

The adhesive resin composition according to an exemplary embodiment of the present invention may have a mixed methylcyclohexane aniline cloud point (MMAP) of 60° C. or lower and a diacetone alcohol cloud point (DACP) of 60° C. or lower.

Advantageous Effects

The dicyclopentadiene-based resin according to the present invention has excellent compatibility with various base resins and may be provided as an adhesive resin composition which may implement a significantly improved adhesive strength.

BEST MODE

Hereinafter, the dicyclopentadiene-based resin, the dicyclopentadiene-based hydrogenated resin, and the adhesive resin composition including the same will be described in more detail, by the exemplary embodiments. However, the following exemplary embodiments are only a reference for describing the present invention in detail, and the present invention is not limited thereto, and may be implemented in various forms.

In addition, unless otherwise defined, all technical terms and scientific terms have the same meanings as those commonly understood by a person skilled in the art to which the present invention pertains. The terms used herein are only for effectively describing a certain exemplary embodiment, and not intended to limit the present invention.

In the present specification, a "pressure-sensitive adhesive" is understood as a viscoelastic adhesive which allows a dry film set at room temperature to be permanently tacky and maintain its adhesive strength, and may be bonded by pressure which is weakly applied to various substrates.

In order to achieve the above objects, the present invention relates to a dicyclopentadiene-based resin and a dicyclopentadiene-based hydrogenated resin having excellent compatibility with various base resins, and an adhesive resin composition including the same.

Hereinafter, the present invention will be described in more detail.

The dicyclopentadiene-based resin according to the present invention is prepared by copolymerizing a monomer composition including a dicyclopentadiene-based monomer and a vinylamide-based monomer.

A conventional dicyclopentadiene-based resin lacks compatibility with a base resin such as olefin-based, styrene-based, and acryl-based resins, and when provided as an adhesive or tackifying resin composition, an adhesive strength such as a 180° peel strength and a tack force in a loop tack test is low, or the kind of base resins used is limited.

In order to solve this, conventionally, a method of providing a dicyclopentadiene-based resin by copolymerizing a C9-based monomer selected from styrene-based and indene-based monomers and the like or a C5-based monomer selected from piperylene, isoprene, and the like with a dicyclopentadiene-based monomer, has been proposed. When the olefin-based monomer such as C9-based monomers and C5-based monomers is copolymerized to provide the dicyclopentadiene-based resin, compatibility with a base resin is improved as compared with a dicyclopentadiene homo resin, but a reaction time for reaching a target softening point may be extended or an excessive burden in a hydrogenation reaction may be imposed.

Unlike this, the dicyclopentadiene-based resin according to the present invention is prepared by copolymerizing a monomer composition including a dicyclopentadiene-based monomer and a vinylamide-based monomer, thereby further improving compatibility with a base resin, while maintaining a polarity region even after the hydrogenation reaction.

In addition, among styrene-based copolymers, the conventional dicyclopentadiene-based resin has compatibility with a styrene-isoprene-styrene block copolymer, but has significantly low compatibility with a styrene-butadiene-styrene block copolymer. As such, the kind of conventional dicyclopentadiene-based resin used as a base resin is limited among the styrene-based copolymers, however, the dicyclopentadiene-based resin according to the present invention is not particularly limited on the kind of styrene-based copolymer and has excellent miscibility and compatibility with various base resins. In addition, when provided as an adhesive resin composition, a significantly improved adhesive strength such as a 180° peel strength and a tack force in a loop tack test may be implemented.

According to an exemplary embodiment of the present invention, the dicyclopentadiene-based monomer may include any one or two or more selected from unsubstituted or substituted dicyclopentadienes. The substituted dicyclopentadiene may be dicyclopentadiene substituted with a C1-C5 alkyl group, such as 1-methyldicyclopentadiene, but is not limited thereto. The dicyclopentadiene-based monomer may be in an endo- or exo-form.

According to an exemplary embodiment of the present invention, the vinylamide-based monomer is a compound containing an amide group and a vinyl group. Specifically, the vinyl group is not particularly limited as long as it is a functional group containing a double bond, but specifically for example, the vinyl group may include any one or two or more selected from the group consisting of an ethenyl group (—CH=CH$_2$), an acrylate group (—O(C=O)CH=CH$_2$), and the like.

Preferably, the vinylamide-based monomer may include an aliphatic, an alicyclic, or an aromatic hydrocarbon structure. More preferably, the vinylamide-based monomer may satisfy the following Chemical Formula 1:

[Chemical Formula 1]

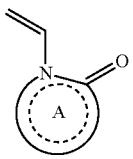

wherein

A is a saturated or unsaturated cyclic hydrocarbon.

Specifically, Chemical formula 1 may be a saturated or unsaturated heterocyclic hydrocarbon formed by forming A while including an amide group. Preferably, A may be derived from a heteroaryl group or a heterocycloalkyl group. For example, A may be derived from a heteroaryl group which is an unsaturated heterocyclic hydrocarbon selected from the group consisting of a pyrrole group, a pyridine group, a pyrimidine group, an azepine group, an imidazole group, a pyridazine group, an indole group, a diazine group, and the like. Otherwise, A may be derived from a heterocycloalkyl group which is a saturated heterocyclic hydrocarbon selected from the group consisting of a pyrrolidine group, a pyrrolidone group, a piperidine group, a lactam group, and the like.

More preferably, according to an exemplary embodiment of the present invention, the vinylamide-based monomer may be an alicyclic vinylamide-based monomer which is a lactam-based vinyl compound containing an amide group, for improved compatibility and improved adhesive strength with a base resin. Specifically, the alicyclic vinylamide-based monomer may satisfy the following Chemical Formula 2:

[Chemical Formula 2]

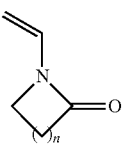

wherein n is an integer selected from 1 to 15.

As the compound satisfying Chemical Formula 2, specifically for example, the alicyclic vinylamide-based monomer may include one or two or more selected from the group consisting of N-vinylcaprolactam, N-vinylpyrrolidone, N-vinylpiperidone, N-vinyllaurolactam, and the like. When copolymerization is performed including the alicyclic vinylamide-based monomer as described above, not only compatibility with various base resins but also an adhesive strength may be significantly improved. In addition, when the dicyclopentadiene-based resin is hydrogenated, compatibility with a base resin may be significantly improved while its nature is maintained.

According to an exemplary embodiment of the present invention, though the dicyclopentadiene resin includes a comonomer which is the vinylamide-based monomer, the resin has a low molecular weight and a low molecular weight distribution so that the resin may be applied as an adhesive resin composition and may implement an excellent adhesive strength, and thus, is excellent as an adhesive or a tackifier.

According to an exemplary embodiment of the present invention, the dicyclopentadiene resin may include the dicyclopentadiene-based monomer and the vinylamide-based monomer at a weight ratio of 99:1 to 50:50. Preferably, the weight ratio may be 99:1 to 70:30. More preferably, the weight ratio may be 99:1 to 80:20. When the dicyclopentadiene resin includes the monomers at the content described above, compatibility with a base resin may be improved without using an excessive amount of comonomers, and an adhesive strength may be significantly improved.

According to an exemplary embodiment of the present invention, the dicyclopentadiene-based resin may have a number average molecular weight (Mn) of 200 to 1,200 g/mol, a weight average molecular weight (Mw) of 250 to 4,000 g/mol, and a Z average molecular weight (Mz) of 300 to 5,000 g/mol. Preferably, the dicyclopentadiene-based resin may have a number average molecular weight of 250 to 1,000 g/mol, a weight average molecular weight of 300 to 3,000 g/mol, and a Z average molecular weight of 350 to 4,000 g/mol. More preferably, the dicyclopentadiene-based resin may have a number average molecular weight of 200 to 800 g/mol, a weight average molecular weight of 300 to 3,000 g/mol, and a Z average molecular weight of 400 to 4,000 g/mol. When the dicyclopentadiene-based resin has a molecular weight as described above, surface contamination such as the release of an organic matter of a low molecular weight may be prevented even after the hydrogenation reaction, and an excellent adhesive strength may be expressed.

The dicyclopentadiene-based resin according to the present invention may achieve the effects to be desired as described above only with the dicyclopentadiene-based monomer and the vinylamide-based monomer, but which should not be limitedly interpreted as excluding the case of further including other monomers.

According to an exemplary embodiment of the present invention, the monomer composition may further include any one or a mixture of two or more selected from the group consisting of olefin-based monomers, aromatic vinyl-based monomers, and the like, in addition to the dicyclopentadiene-based monomer and the vinylamide-based monomer, but is not limited thereto.

According to an exemplary embodiment of the present invention, the olefin-based monomer may include, specifically for example, any one or a mixture of two or more selected from the group consisting of piperylene, isoprene, ethylene, propylene, 1-butene, 1-pentene, 1-hexene, 1-heptene, 1-octene, 1-decene, 1-undecene, 1-dodecene, 1-tetradecene, 1-hexadecene, mixed C5 fractions, and the like. Preferably, the olefin-based monomer may include a $C_4$-$C_{10}$ olefin-based monomer. Specifically for example, any one or a mixture of two or more selected from the group consisting of piperylene, isoprene, 1-butene, 1-pentene, 1-hexene, 1-heptene, 1-octene, 1-decene, and the like may be included, but not limited thereto.

The mixed C5 fraction may be formed of a mixture of isoprene, piperylene, cyclopentadiene, 1-pentene, 2-methyl-2-butene, n-pentane, and the like. Specifically, the mixed C5 fraction may be formed of 10 to 20 wt % of isoprene, 10 to 20 wt % of piperylene, 0.5 to 1.5 wt % of cyclopentadiene, 2 to 4 wt % of 1-pentene, 3 wt % of 2-methyl-2-butene, and 25 to 35 wt % of n-pentane. More specifically, most of the C5 fractions globally used may be a piperylene concentrated fraction having piperylene as a main monomer.

According to an exemplary embodiment of the present invention, the monomer composition may preferably include an aromatic vinyl-based monomer, and specifically for example, the aromatic vinyl-based monomer may include any one or a mixture of two or more selected from the group consisting of styrene, alpha-methylstyrene, para-methylstyrene, indene, methyl indene, vinyltoluene, mixed C9 fractions, derivatives thereof, and the like, but is not limited thereto.

The mixed C9 fraction may be formed of a mixture of styrene, vinyltoluene, indene, alpha-methylstyrene, benzene, toluene, xylene (BTX), and the like. Specifically, the mixed C9 fraction may be formed of 10 to 20 wt % of styrene, 10 to 20 wt % of vinyltoluene, 10 to 20 wt % of indene, 1 to 7 wt % of alpha-methylstyrene, and 40 to 60 wt % of xylene.

According to an exemplary embodiment of the present invention, the monomer composition may be used in a state of being dissolved in a solvent, and as the solvent, those commonly used in the art to which the present invention pertains may be used. Specifically for example, the solvent may be any one or a mixed solvent of two or more selected from the group consisting of pentane, hexane, heptane, nonane, decane, benzene, toluene, xylene, and the like, but is not limited thereto.

According to an exemplary embodiment of the present invention, a method of preparing the dicyclopentadiene-based resin is not particularly limited, as long as a common method of preparing a dicyclopentadiene-based resin is used, and preferably the method may include a) a step of primarily thermally polymerizing a primary polymerized product of a petroleum resin in a continuous stirred tank reactor (CSTR) and b) a step of secondarily thermally polymerizing the primary polymerized product in a plug flow reactor (PFR).

Specifically, the method of preparing the dicyclopentadiene-based resin is performed in two steps, and first, a reactant may be primarily thermally polymerized in the continuous stirred tank reactor (CSTR). Thereafter, the primary polymerized product prepared therefrom may be supplied to the plug flow reactor (PFR) connected to the continuous stirred tank reactor and secondarily thermally polymerized to prepare the dicyclopentadiene-based resin. By preparing the resin by stepwise polymerization as such, heat of polymerization reaction may be easily controlled, a conversion rate or polymerization rate of the monomer is significantly improved, and the dicyclopentadiene-based resin having a narrow molecular weight distribution to have uniform physical properties may be provided.

According to an exemplary embodiment of the present invention, a reaction temperature ($T_1$) in the step a) may be 210 to 270° C., preferably 220 to 270° C. When the reaction is performed at the reaction temperature, the conversion rate or polymerization rate of the monomer is excellent, and occurrence of a side reaction such as a crosslinking reaction is suppressed so that the resin may have a low polydispersity index, thereby implementing uniform physical properties with a narrow molecular weight distribution.

According to an exemplary embodiment of the present invention, a reaction pressure in the step a) may be 1 to 40 bar, preferably 5 to 35 bar, and more preferably 10 to 30 bar. When the reaction is performed at the reaction pressure, the reactivity of the monomer may be increased within the range in which there is no safety accident risk.

According to an exemplary embodiment of the present invention, a reaction time in the step a) may be 10 to 180 minutes, preferably 20 to 150 minutes, and more preferably 30 to 100 minutes. When the reaction is performed for the amount of reaction time, a side reaction due to mixing of raw materials may be suppressed and a narrow molecular weight distribution may be provided.

According to an exemplary embodiment of the present invention, a reaction temperature ($T_2$) in the step b) may be 180 to 300° C., preferably 180 to 290° C., and more preferably 180 to 280° C. More specifically, the reaction temperature ($T_2$) in the step b) may be the reaction temperature ($T_1$) in the step a) ±30° C., preferably the reaction temperature ($T_1$) in the step a) ±20° C., and more preferably the reaction temperature ($T_1$) in the step a) ±10° C. That is, the reaction temperature ($T_2$) may be $T_1-30°$ C. to $T_1+30°$ C., preferably $T_1-20°$ C. to $T_1+20°$ C., and more preferably $T_1-10°$ C. to $T_1+10°$ C. When the reaction is performed at the reaction temperature, a side reaction may be suppressed, and productivity may be increased.

In addition, by adjusting a temperature difference between the step a) and the step b) to 10 to 30° C. like the reaction temperature as described above, production of unreacted oligomers may be minimized and a dicyclopentadiene-based resin having a narrow molecular weight distribution may be prepared.

According to an exemplary embodiment of the present invention, a reaction pressure in the step b) may be 1 to 40 bar, preferably 5 to 35 bar, and more preferably 10 to 30 bar. When the reaction is performed at the reaction pressure, occurrence of a dead zone due to vaporized monomers may be suppressed within the range in which there is no safety accident risk.

According to an exemplary embodiment of the present invention, a reaction time in the step b) may be 10 to 360 minutes, preferably 20 to 240 minutes, and more preferably 30 to 140 minutes. More specifically, the reaction time in the step b) may be 1 to 4 times, preferably 1 to 3 times, and more preferably 1 to 2 times the reaction time in the step a). When the reaction is performed for the amount of reaction time, a side reaction may be suppressed to prepare the dicyclopentadiene-based resin having a narrow molecular weight distribution.

Another embodiment according to the present invention is to provide a dicyclopentadiene-based hydrogenated resin prepared by hydrogenating the dicyclopentadiene-based resin as described above.

According to an exemplary embodiment of the present invention, the hydrogenation reaction is not particularly limited, but may be performed by the method known in the art to which the present invention pertains. The hydrogenation reaction is a reaction to add hydrogen to a double bond in an unsaturated state to form a single bond, and the dicyclopentadiene-based hydrogenated resin in which the double bonds are all removed by the hydrogenation reaction of the dicyclopentadiene-based resin, may be prepared.

According to an exemplary embodiment of the present invention, the hydrogenation reaction may be performed at 150 to 300° C. under a pressure of 50 to 150 bar, but is not limited thereto. When the reaction is performed under the pressure and the temperature described above, molecular structure destruction may be prevented.

According to an exemplary embodiment of the present invention, a hydrogenation catalyst is not particularly limited, but any catalyst may be used as long as it is a known hydrogenation catalyst. Specifically for example, the hydrogenation catalyst may be any one or a mixture of two or more selected from the group consisting of Ni, Fe, Cu, Co, Mo, Pd, Rh, Pt, Nb, Au, Rd, Raney Ni, and the like.

According to an exemplary embodiment of the present invention, the hydrogenation catalyst may be included at a mole ratio of 0.001 to 0.5, preferably 0.05 to 0.2, based on 1 mol of the petroleum resin monomer for improving reactivity, but not limited thereto.

According to an exemplary embodiment of the present invention, the dicyclopentadiene-based hydrogenated resin which has undergone the hydrogenation reaction as described above may be used as a hot melt adhesive, a pressure-sensitive adhesive, or the like, or may be blended with various base resins to be used as an adhesive or a tackifier. In addition, the dicyclopentadiene-based hydrogenated resin may function as a tackifying or adhesion imparting resin to an ink, a paint, a road marking paint, and the like, and thus, is expected to be used in various technical fields.

Still another embodiment according to the present invention is to provide an adhesive resin composition including the dicyclopentadiene-based hydrogenated resin described above and a thermoplastic resin.

The dicyclopentadiene-based hydrogenated resin according to the present invention has excellent compatibility with a thermoplastic resin, and may be blended with the thermoplastic resin to provide an adhesive resin composition having a significantly improved adhesive strength.

According to an exemplary embodiment of the present invention, the thermoplastic resin is provided as the base resin of the adhesive resin composition and is not particularly limited as long as it is a resin which may be used in the adhesive resin composition, but preferably the thermoplastic resin may include any one or two or more selected from olefin-based copolymers, styrene-based copolymers, and the like. The dicyclopentadiene-based hydrogenated resin according to the present invention includes a repeating unit derived from a vinylamide-based monomer, thereby having excellent compatibility with a polar thermoplastic resin as well as a nonpolar thermoplastic resin to significantly improve an adhesive strength.

Specifically for example, the olefin-based copolymer may include any one or two or more selected from the group consisting of an ethylene-vinyl acetate (EVA) copolymer, an ethylene-ethyl acrylate (EEA) copolymer, an ethylene-acrylic acid (EAA) copolymer, an ethylene-methacrylic acid (EMAA) copolymer, an ethylene-methyl acrylate (EMA) copolymer, an ethylene-butyl acrylate (EBA) copolymer, an ethylene-propylene rubber (EPR) copolymer, an amorphous polyalphaolefin (APAO), and the like, but is not limited thereto. The styrene-based copolymer may include any one or two or more selected from the group consisting of a styrene-isoprene (SI) copolymer, a styrene-isoprene-styrene (SIS) copolymer, a styrene-butadiene (SB) copolymer, a styrene-butadiene-styrene (SBS) copolymer, a styrene-ethylene-propylene-styrene (SEPS) copolymer, a styrene-isoprene-butadiene-styrene (SIBS) copolymer, a styrene-ethylene-butylene-styrene (SEBS) copolymer, and the like, but is not limited thereto.

According to an exemplary embodiment of the present invention, the dicyclopentadiene-based hydrogenated resin includes a repeating unit derived from a vinylamide-based monomer, thereby preferably having excellent compatibility with the thermoplastic resin having a polar group and including 5 to 40 wt %, preferably 10 to 35 wt % of the polar group, based on the total weight of the thermoplastic resin, but it not limited thereto.

According to an exemplary embodiment of the present invention, the adhesive resin composition may include 50 to 90 wt % of the dicyclopentadiene-based hydrogenated resin and 10 to 50 wt % of the thermoplastic resin, based on the total weight of the adhesive resin composition. Preferably, the adhesive resin composition may include 50 to 80 wt % of the dicyclopentadiene-based hydrogenated resin and 20 to 50 wt % of the thermoplastic resin. More preferably, the adhesive resin composition may include 55 to 75 wt % of the cyclopentadiene-based hydrogenated resin and 25 to 45 wt % of the thermoplastic resin, but is not limited thereto. When the adhesive resin composition includes the contents as described above, it may implement significantly improved compatibility with the thermoplastic resin, and implement an excellent adhesive strength such as a 180° peel strength and a tack force in a loop tack test.

The dicyclopentadiene-based hydrogenated resin according to the present invention may provide the adhesive resin composition having excellent compatibility and an adhesive strength, even in the case that the resin is blended with various thermoplastic resins as described above.

According to an exemplary embodiment of the present invention, the adhesive resin composition may further include an oil. Specifically for example, the oil may be any one or two or more selected from the group consisting of paraffin-based oils, naphthene-based oils, aromatic-based oils, and the like.

According to an exemplary embodiment of the present invention, the adhesive resin composition may further include an additive which is commonly used in the art to which the present invention pertains, such as an antioxidant and a UV stabilizer.

According to an exemplary embodiment of the present invention, the adhesive resin composition may have a softening point of 50 to 100° C., preferably 50 to 80°, and more preferably 50 to 70° C. after curing. When the adhesive resin composition has a low softening point as described above, the composition may be used at a low temperature and implement an excellent adhesive strength.

According to an exemplary embodiment of the present invention, the adhesive resin composition may include 1 to 60 parts by weight of the oil, based on 100 parts by weight of the dicyclopentadiene-based hydrogenated resin and the thermoplastic resin. Preferably, the adhesive resin composition may include 1 to 40 parts by weight of the oil, based on 100 parts by weight of the dicyclopentadiene-based hydrogenated resin and the thermoplastic resin. More preferably, the adhesive resin composition may include 5 to 35 parts by weight of the oil, based on 100 parts by weight of the dicyclopentadiene-based hydrogenated resin and the thermoplastic resin, but is not limited thereto. When the adhesive resin composition includes the contents described above, a significantly improved adhesive strength may be implemented and also organic matters having a low molecular weight may be released to the surface, thereby preventing occurrence of adhesive surface contamination or surrounding contamination over time.

According to an exemplary embodiment of the present invention, the adhesive resin composition may have a mixed methylcyclohexane aniline cloud point (MMAP) of 60° C. or lower and a diacetone alcohol cloud point (DACP) of 60° C. or lower. Preferably, the mixed methylcyclohexane aniline cloud point may be 58° C. or lower, and the diacetone alcohol cloud point may be 58° C. or lower. More preferably, the mixed methylcyclohexane aniline cloud point may be 57° C. or lower, and the diacetone alcohol cloud point may be 55° C. or lower. When the adhesive resin composition has the mixed methylcyclohexane aniline cloud point and the diacetone alcohol cloud point as described above, miscibility with a base resin is excellent and in particular miscibility with a polar base resin is high so that excellent compatibility is implemented and an improved adhesive strength may be provided.

The mixed methylcyclohexane aniline cloud point is measured in accordance with revised ASTM D 611. Methylcyclohexane was used for heptane used in a standard test method. In this method, resin/aniline/methylcyclohexane is used at a ratio of 1/2/1 (weight/volume/volume), and a transparent mixture of the heated three components is cooled until the mixture is completely cloudy, thereby measuring a point at which the mixture is completely cloudy as a cloud point.

The diacetone alcohol cloud point is measured in accordance with revised ASTM D 611. A solution of 5 g of a resin, 5 g of xylene, and 5 g of diacetone alcohol is cooled until the solution reaches a cloud point at which the solution turns cloudy, thereby measuring a point at which the solution is completely cloudy as a cloud point.

According to an exemplary embodiment of the present invention, the 180° peel strength of the adhesive resin composition may satisfy the following Equation 1:

$$\frac{Peel_A}{Peel_B} \times 100 \geq 105 \qquad \text{[Equation 1]}$$

wherein $Peel_A$ is a 180° peel strength (kgf/25 mm) of the adhesive resin composition including the dicyclopentadiene-based resin prepared from the vinylamide-based monomer according to the present invention and a base resin, and Peel$_B$ is a 180° peel strength (kgf/25 mm) of the adhesive resin composition including a dicyclopentadiene homo resin prepared without the vinylamide-based monomer according to the present invention and a base resin.

Preferably, in Equation 1, the 180° peel strength may be measured for the adhesive resin composition further including a styrene-based copolymer as the base resin, and more preferably, may be measured for the adhesive resin composition further including a styrene-butadiene-styrene block copolymer as the base resin. When the adhesive resin composition further including the styrene-based copolymer, Equation 1 may be satisfied at 110% or more.

According to an exemplary embodiment of the present invention, a tack force of the adhesive resin composition may satisfy the following Equation 2:

$$\frac{Tack_A}{Tack_B} \times 100 \geq 120 \qquad \text{[Equation 2]}$$

wherein Tack$_A$ is a tack force (kgf) of the adhesive resin composition including the dicyclopentadiene-based resin prepared from the vinylamide-based monomer according to the present invention and a base resin, and Tack$_B$ is a tack force (kgf) of the adhesive resin composition including a dicyclopentadiene homo resin prepared without the vinylamide-based monomer according to the present invention and a base resin.

Preferably, in Equation 2, the tack force may be measured for the adhesive resin composition further including a styrene-based copolymer as the base resin, and more preferably, may be measured for the adhesive resin composition further including a styrene-butadiene-styrene block copolymer as the base resin. When satisfied, Equation 2 may be satisfied at 200% or more, more preferably 300% or more.

When the adhesive resin composition according to the present invention has the physical properties as described above, it may be provided as an adhesive having excellent loop tack and peel properties.

Hereinafter the present invention will be described in detail with reference to the Examples. However, they are for describing the present invention in more detail, and the scope of the present invention is not limited to the following Examples.

Further, unless otherwise stated, the unit of added materials herein may be wt %.

[Measurement Method of Physical Properties]

1. Molecular Weight

A weight average molecular weight (Mw) in terms of polystyrene, a Z average molecular weight (Mz), and a number average molecular weight (Mn) were measured by gel permeation chromatography (GPC, Infinity1260). The dicyclopentadiene-based resin to be measured was dissolved in tetrahydrofuran so that the concentration was 0.05 wt % and 10 µl of the solution was injected to GPC. As the mobile phase of GPC, tetrahydrofuran was used, the mobile phase was flowed in at a flow rate of 1 mL/min, and analysis was performed at 35° C. As a column, one guard column and three columns of PL gel 5 µm 50A, PL gel 5 µm 100A, and oligopore 300A were connected in series. As a detector, a refractive index detector (RID) was used to perform measurement at 35° C.

2. Softening Point

Measurement was performed using a ring and ball softening method (ASTM E 28). A melted resin was injected to an annular mold and left in a beaker with glycerin, and then a ball was put on a ring with the resin, the temperature was raised at 2.5° C./min, and the temperature (softening point) at which the resin melted so that the ball drops was measured.

3. Evaluation of Adhesion

On a 50 µm PET film having a corona-treated cross section, an adhesive resin composition was applied at a wetting thickness of 36 µm (barb coater number 16) with an automatic applicator. The applied film was dried at 100° C. for 30 minutes to remove the solvent, and a FT-1 universal material testing machine available from LLOYD was used to measure a 180° peel strength and a tack force in a loop tack test.

4. Compatibility

A mixed methylcyclohexane aniline cloud point is measured in accordance with revised ASTM D 611. Methylcyclohexane was used for heptane used in a standard test method. In this method, resin/aniline/methylcyclohexane was used at a ratio of 1/2/1 (weight/volume/volume), and a transparent mixture of the heated three components was cooled until the mixture was completely cloudy, thereby measuring a point at which the mixture was completely cloudy as a cloud point.

A diacetone alcohol cloud point is measured in accordance with revised ASTM D 611. A solution of 5 g of a resin, 5 g of xylene, and 5 g of diacetone alcohol was cooled until the solution reached a cloud point at which the solution turned cloudy, thereby measuring a point at which the solution was completely cloudy as a cloud point.

For compatibility with an ethylene-vinyl acetate copolymer (EVA), 40 wt % of a resin, 40 wt % of EVA, and 20 wt % of paraffinic wax (melting point: 20° C., dongnamyuhwa) were melted by heating at 200° C., and when the melted content was cooled, the compatibility of the petroleum resin and each molecule of EVA was lowered so that the content became cloudy, and the temperature at this time was measured.

Here, the resin used in compatibility measurement was the dicyclopentadiene-based hydrogenated resin prepared in the Example and the Comparative Example.

Example 1

Preparation of Dicyclopentadiene-Based Resin

A monomer composition in which dicyclopentadiene, N-vinylpyrrolidone, and xylene were mixed at 45:5:50 was prepared. While the monomer composition was continuously supplied to a continuous stirred tank reactor (CSTR) having an internal volume of 0.416 L, the monomer composition was reacted with stirring for 30 minutes under the condition of a temperature of 260° C. and a pressure of 25 bar to prepare a primary polymerized product.

While the primary polymerized product prepared as described above was continuously supplied to a plug flow reactor (PFR) having an internal volume of 0.590 L connected to the continuous stirred tank reactor, the primary polymerized product was polymerized for 45 minutes under the condition of a temperature of 272° C. and a pressure of 25 bar. The polymerization-completed product was depressurized at 180° C. for 30 minutes to prepare a dicyclopentadiene-based resin (DCPD-VP). Here, the physical properties of the dicyclopentadiene-based resin (DCPD-VP) were a weight average molecular weight (Mw) of 481 g/mol, a number average molecular weight (Mn) of 357 g/mol, a z average molecular weight (Mz) of 879 g/mol, a polydispersity index (PDI) of 1.35, and a softening point of 65° C.

Preparation of Dicyclopentadiene-Based Hydrogenated Resin

A hydrogenation reaction was performed twice under the condition of a temperature of 250° C. and a pressure of 100 bar, using a palladium catalyst of 0.5 wt % and a hydrogen amount of 4 Nl/min, based on the total weight of the dicyclopentadiene-based resin (DCPD-VP), thereby obtaining a dicyclopentadiene-based hydrogenated resin (H-DCPD-VP).

Preparation of Adhesive Resin Composition

First, a styrene-isoprene-styrene (SIS) block copolymer (Kraton D1161) was determined as a base resin, and 25 wt % of SIS, 57 wt % of the dicyclopentadiene-based hydrogenated resin, and 18 wt % of a paraffinic oil (Merck) were mixed and dissolved in toluene to prepare a composition.

As another base resin, a styrene-butadiene-styrene (SBS) block copolymer (LCY Globalprene 3546) was determined, and 25 wt % of SBS, 57 wt % of the dicyclopentadiene-based hydrogenated resin, and 18 wt % of the paraffinic oil were mixed and dissolved in toluene to prepare a composition.

The adhesive resin composition was applied on a 50 µm PET film having a corona-treated cross section at a wetting thickness of 36 µm, using an automatic applicator. Thereafter, the composition was dried at 110° C. for 30 minutes to remove the solvent and a tape specimen was prepared.

Example 2

A dicyclopentadiene-based resin (DCPD-VC) was prepared in the same manner as in Example 1, except that N-vinylcaprolactam was used instead of N-vinylpyrrolidone when preparing the dicyclopentadiene-based resin. Here, the physical properties of the dicyclopentadiene-based resin (DCPD-VC) were a weight average molecular weight (Mw) of 490 g/mol, a number average molecular weight (Mn) of 366 g/mol, a z average molecular weight (Mz) of 888 g/mol, a polydispersity index (PDI) of 1.34, and a softening point of 65° C.

The dicyclopentadiene-based resin (DCPD-VC) prepared as described above was used to prepare the hydrogenated resin and the adhesive resin composition in the same manner as in Example 1.

Comparative Example 1

A dicyclopentadiene resin (DCPD) was prepared in the same manner as in Example 1, except that a monomer composition in which dicyclopentadiene and xylene were mixed at a weight ratio of 50:50 was used. Here, the physical properties of the dicyclopentadiene resin (DCPD) were a weight average molecular weight (Mw) of 459 g/mol, a number average molecular weight (Mn) of 339 g/mol, a z average molecular weight (Mz) of 864 g/mol, a polydispersity index (PDI) of 1.35, and a softening point of 65° C.

The dicyclopentadiene resin (DCPD) prepared as described above was used to prepare the hydrogenated resin and the adhesive resin composition in the same manner as in Example 1.

It was confirmed from Examples 1 and 2 and Comparative Example 1 that the dicyclopentadiene-based resin according to the present invention may have a narrow molecular weight distribution and implement uniform physical properties.

TABLE 1

| | 180° peel strength (kgf/25 mm) | | Tack force (kgf) | | Softening point | Compatibility | | |
|---|---|---|---|---|---|---|---|---|
| | SIS | SBS | SIS | SBS | (° C.) | MMAP | DACP | EVA |
| Example 1 | 0.86 | 1.13 | 1.18 | 0.76 | 101 | 55 | 50 | 40 |
| Example 2 | 0.84 | 1.03 | 1.07 | 0.64 | 103 | 58 | 52 | 44 |
| Comparative Example 1 | 0.76 | 0.91 | 0.92 | 0.11 | 103 | 65 | 70 | 59 |

As shown in Table 1, it was confirmed that the adhesive resin composition including the dicyclopentadiene-based hydrogenated resin according to the present invention has significantly excellent compatibility with the ethylene-vinyl acetate copolymer and has excellent compatibility with various base resins by the mixed methylcyclohexane aniline cloud point and the diacetone alcohol cloud point. Moreover, it was confirmed from Comparative Example 1 that an improved adhesive strength was shown to the styrene-isoprene-styrene block copolymer, but a significantly reduced adhesive strength was shown to the styrene-butadiene-styrene block copolymer. However, in Examples 1 and 2 according to the present invention, a significantly improved adhesive strength was shown to the styrene-butadiene-styrene block copolymer as well as the styrene-isoprene-styrene block copolymer, and the significantly excellent compatibility with the ethylene-vinyl acetate copolymer was confirmed as compared with Comparative Example 1.

Therefore, the adhesive resin composition according to the present invention includes the dicyclopentadiene-based hydrogenated resin having excellent compatibility with various base resins to implement a significantly improved adhesive strength, and thus, may be applied as an adhesive or a tackifier requiring blending with various base resins.

The present invention described above is only an example, and it may be well understood by a person with ordinary knowledge in the art to which the present invention pertains that various modification and equivalent other examples are possible therefrom. Therefore, it may be well understood that the present invention is not limited only to the form mentioned in the above detailed description. Accordingly, the true technical protection scope of the present invention must be determined by the spirit of the appended claims.

Therefore, the spirit of the present invention should not be limited to the above-described exemplary embodiments, and the following claims as well as all modified equally or equivalently to the claims are intended to fall within the scope and spirit of the invention.

The invention claimed is:

1. An adhesive resin composition comprising a dicyclopentadiene-based hydrogenated resin and a thermoplastic resin,
    wherein the dicyclopentadien-based hydrogenated resin is prepared by hydrogenating a dicyclopentadiene-based resin prepared by copolymerizing a monomer composition including a dicyclopentadiene-based monomer and a vinylamide-based monomer, and the adhesive resin composition has a mixed methylcyclohexane and aniline cloud point of 60° C. or lower, and a diacetone cloud point of 60° C. or lower,
    and wherein the dicyclopentadiene-based resin has a number average molecular weight (Mn) of 200 to 1,200 g/mol, a weight average molecular weight (Mw) of 250 to 4,000 g/mol, and a Z average molecular weight (Mz) of 300 to 5,000 g/mol.

2. The adhesive resin composition of claim 1, further comprising an oil.

3. The adhesive resin composition of claim 2, wherein the oil includes any one or two or more selected from the group consisting of paraffin-based oils, naphthene-based oils, and aromatic-based oils.

4. The adhesive resin composition of claim 1, wherein 50 to 90 wt % of the dicyclopentadiene-based hydrogenated resin and 10 to 50 wt % of the thermoplastic resin are included, based on a total weight of the adhesive resin composition.

5. The adhesive resin composition of claim 2, wherein 1 to 60 parts by weight of the oil is included, based on 100 parts by weight of the dicyclopentadiene-based hydrogenated resin and the thermoplastic resin.

6. The adhesive resin composition of claim 1, wherein the dicyclopentadiene-based resin is prepared by stepwise thermal polymerization.

* * * * *